Figure 1:
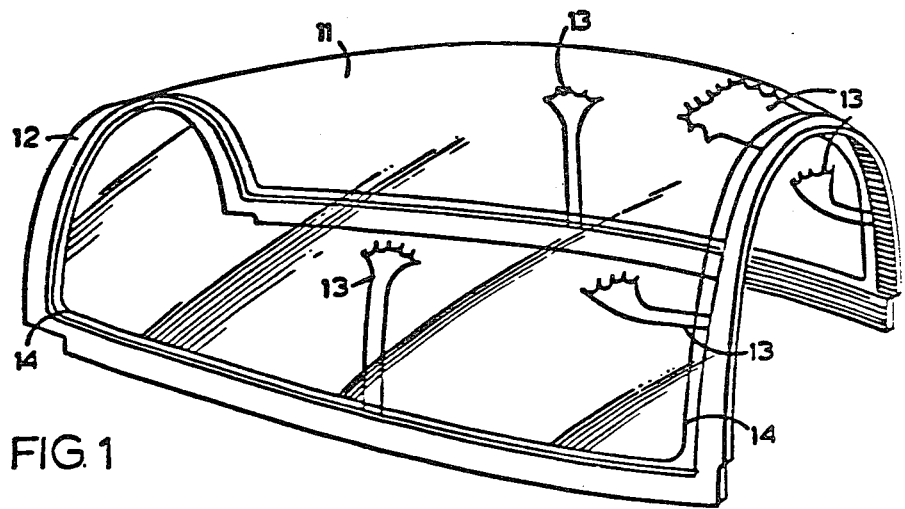

United States Patent [19]
Charman et al.

[11] 4,405,104
[45] Sep. 20, 1983

[54] PANEL BREAKING APPARATUS

[75] Inventors: David H. Charman, Horsham; Clara Turner; Henry W. Turner, both of Ashtead, all of England

[73] Assignee: The Secretary of State for Defence in Her Britannic Majesty's Government of the United Kingdom of Great Britain and Northern Ireland, London, England

[21] Appl. No.: 406,372

[22] Filed: Aug. 9, 1982

Related U.S. Application Data

[63] Continuation of Ser. No. 213,082, Dec. 4, 1980, abandoned, which is a continuation of Ser. No. 968,925, Dec. 13, 1978, abandoned.

[30] Foreign Application Priority Data

Dec. 14, 1977 [GB] United Kingdom ............... 52077/77

[51] Int. Cl.³ .............................................. B64C 1/32
[52] U.S. Cl. ................. 244/122 AF; 89/1 B; 102/202.7
[58] Field of Search ......... 244/121, 122 AF, 122 AE; 89/1 B; 102/202.7, 206

[56] References Cited

U.S. PATENT DOCUMENTS

| 3,158,098 | 11/1964 | Reithel | 102/202.7 |
| 3,319,520 | 5/1967 | Stefano et al. | 89/1 B |
| 3,340,807 | 9/1967 | Burr et al. | 102/202.7 |
| 3,806,069 | 4/1974 | Galton | 244/122 AF |
| 4,275,858 | 6/1981 | Bolton et al. | 244/122 AF |

FOREIGN PATENT DOCUMENTS

| 2612574 | 10/1976 | Fed. Rep. of Germany | 244/122 AF |
| 857281 | 12/1960 | United Kingdom | 102/202.7 |

Primary Examiner—Charles E. Frankfort
Attorney, Agent, or Firm—Cushman, Darby & Cushman

[57] ABSTRACT

Panel breaking apparatus for breaking a panel such as a military aircraft cockpit canopy ahead of an ejector seat and wherein at least one conductor formed of aluminum sheathed in palladium is embedded in the panel. The conductor is part of an electrical circuit which comprises initiation switch means, a power reservoir and a source of high electrical energy and is operative upon closure of the switch to explode and break the panel.

6 Claims, 3 Drawing Figures

PANEL BREAKING APPARATUS

This is a continuation, of application Ser. No. 213,082 filed Dec. 4, 1980 now abandoned which is a continuation of Ser. No. 968,925, filed Dec. 13, 1978 now abandoned.

The present invention relates to means enabling the escape of personnel from vehicles and craft, particularly aircraft, and especially through canopies and windscreens.

Aircrew escape from modern high speed aircraft is generally achieved with an ejection seat which projects its occupant out of the aircraft at a high speed and trajectory commensurate with the need to avoid impact with other parts of the fuselage, to reduce the effects of air blast, and to carry the occupant well clear of a possibly exploding aircraft. It is thus requisite that the usual canopy above the head of the airman be opened as rapidly as possible, usually faster than for normal entry or exit. In order to do this the canopy may be opened or removed bodily by mechanisms similar to that used for the ejection seat. Even this may not be sufficiently rapid, however, and appreciable time can be saved if, instead of removing the canopy as a whole, an opening is cut in it through which seat and occupant can pass. This in itself presents difficulties because canopies are usually made of tough material to withstand cabin pressurization and impact by birds, etc.

One apparatus for cutting an opening in a cockpit canopy involves the use of explosive cord such as is described in U.S. Pat. No. 3,806,069. Because of the toughness of the canopy this is however apt to be bulky and thus liable to restrict vision. Moreover, its operation can entail spattering of the person.

U.S. Pat. No. 4,275,858 describes panel breaking apparatus comprising a fusible electrical conductor arranged in intimate contact with the material of the panel and connected to a source of electric power capable of producing a high energy pulse sufficient to explode the conductor and fracture the panel. This patent describes fusible elements made of a metal having a low joule integral for melting. Tin was quoted as having the lowest, followed by nichrome, iron, eureka, zinc, lead, aluminium, silver, and copper in that order. Preferably each element incorporated at least one point of reduced energy of fusion and embedded in an aircraft cockpit canopy in a geometric pattern such that an area of the canopy ahead of an ejection seat can be shattered by fusing the elements. At least one point of reduced energy of fusion may be realised by a sharp V bend in the element or a constriction, and is preferably constituted by both, with the constriction at the apex of the V.

This patent also suggests that a canopy fracture apparatus may comprise two sub-systems, one for shattering the canopy ahead of an ejection seat, and the other, which might employ the miniature detonating cord, the subject of U.S. Pat. No. 3,806,069 for breaking the canopy away from its frame after a crash landing.

The present invention provides a panel breaking apparatus in which considerably more explosive energy is derivable per unit power when compared with the apparatus described in U.S. Pat. No. 4,275,858.

According to the present invention in a panel breaking apparatus comprising a fusible electrical conductor embedded in and in intimate contact with a panel and connected to a source of electrical power, the fusible conductor comprises aluminium sheathed in palladium and the power source is sufficient both to explode the conductor and to initiate violent exothermic alloying between the palladium and the aluminium and thus to fracture the panel.

The fusible conductor is in tape form, embedded in the canopy with the plane of the conductor normal to the local surface of the canopy. With canopy material of the order of 1 cm thick and conductors 0.006 inches wide and 0.0006 inches thick the stress raising effect of this arrangement is insufficient deleteriously to affect the canopy in normal use but valuable in assisting the shattering effect wrought by fusing the conductors.

The proportion by weight of palladium and aluminium is anywhere from 3 parts palladium and 1 of aluminium to 1 part palladium to 2 parts aluminium. The electrical resistance, and perhaps the explosive properties, of the conductor, may be improved if the palladium contains up to 6% ruthenium and the aluminium contains small quantities of chromium, copper, iron, magnesium, manganese, silicon, and/or zinc.

Material comprising aluminium and palladium as described above is sold by Pyrofuze Corporation (Pyrofuze is a trade mark), of New York USA. Its use as a fuzing/separating material is described in U.S. Pat. No. 3,319,520, and in a brochure published by the firm. In these documents it is described as non-explosive and as reacting when ignited in wire form at a relatively slow rate of about 9 cm per second. It will be appreciated that in contradistinction the present invention is based on the discovery that this material will produce impact capable of shattering materials in which it is embedded when overloaded as a fuse wire but will do so at an energy input considerably less even than tin.

The apparatus relies on inductance self-excitation as described in U.S. Pat. No. 4,275,858. That is to say that the fusible element forms part of a circuit comprising also a power reservoir, advantageously a battery, an initiating switch and an inductance, the mode of operation being that making of the switch brings a surge of current from the power reservoir to the inductance, the latter self excites and the power derived therefrom explodes the conductor. It is also preferred that the circuit has a normally closed by-pass switch in parallel with the fusible element and that the by-pass switch is arranged to open shortly after full power is available from the inductance. A delay circuit might accomplish this but in the aircraft cockpit canopy context the by-pass switch may be opened by passage of an ejector seat.

While the conductor may incorporate a point of reduced energy of fusion such as a constriction, perhaps in this instance obtained by crimping, or a V-shaped bend, or a combination of both with the constriction at the apex of the V, this is believed less advantageous in the present instance than with the conductors described in the above-mentioned U.S. Pat. No. 4,275,858. This means that the invention may be more suitable for breaking a canopy away from its frame than for shattering the canopy, because a crack will be generated along the conductor rather than away therefrom at a constriction or V-apex. Or, for an input similar to that indicated in the co-pending U.S. patent application Ser. No. 945,106, now issued as U.S. Pat. No. 4,275,858, a conductor of the present invention but incorporating at least one point of reduced energy of fusion may be expected to generate cracks both along its length and away therefrom at a constriction etc.

Figure 2:
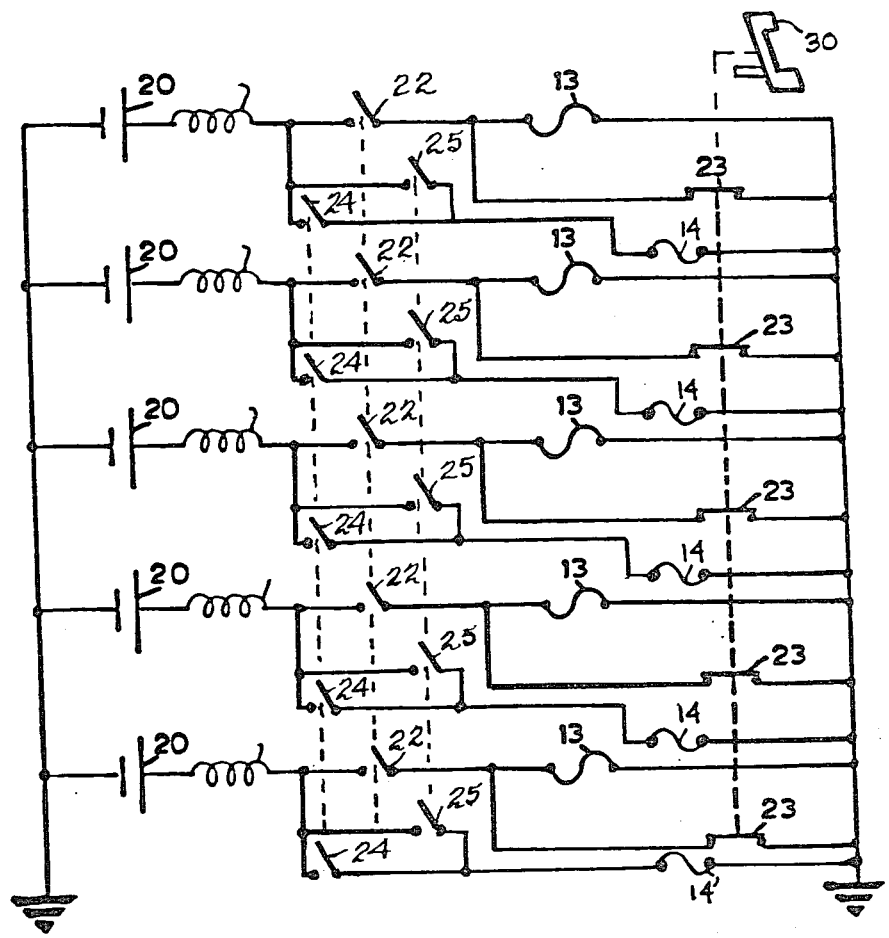
Figure 3:
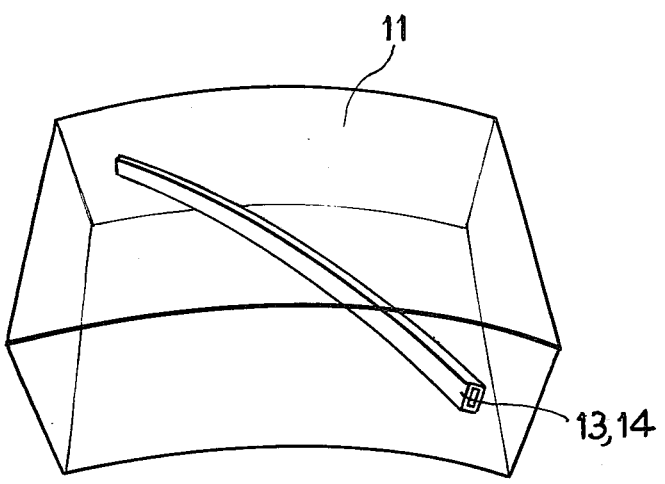

A particular embodiment of a cockpit canopy breaking apparatus in accordance with the invention will now be described by way of example with reference to the accompanying drawings, of which:

FIG. 1 is a view in perspective of an aircraft cockpit canopy carrying fracture apparatus elements, FIG. 2 is a circuit diagram, FIG. 3 is a perspective view of a part of a canopy incorporating Pyrofuze TM tape.

The cockpit canopy shown in FIG. 1 comprises a transparent panel 11 in a frame 12. Embedded in the panel 11 are five elements 13 in a canopy shattering sub-system and five elements 14 in a canopy removal sub-system.

The elements 13 are strategically sited around the area of the canopy through which an aircrewman will pass during ejection, in positions where their effect upon vision is minimised.

They comprise non-fusing leads linked to Pyrofuze TM tape fuses 0.0006 inches×0.006 inches+300 mm arrayed with the plane of the tape normal to the local surface of the canopy and formed with a plurality of V bends pointing around and across the said area. The elements 14 comprises length of 0.0006 inch thick ×0.006 inch wide Pyrofuze TM tape arrayed with the plane of the tape normal to the local surface of the canopy and in an almost closed loop around the panel and close to the frame. The arrangements of the tapes 13 and 14 are as shown in FIG. 3. The leads to the elements 13 are arranged, without local increase in resistivity, to be frangible by detonation of the elements 14, by being formed of lead.

In the circuit shown in FIG. 2 batteries 20 and inductances 21 form common power sources to both the canopy shattering and separation sub-circuits. The canopy shattering sub-circuits comprise an initiating switch 22 in series with an element 13 and a normally closed by-pass switch 23 in parallel with the element 13. The switches 22 are ganged for simultaneous operation at initiation of an ejection sequence. The switches 23 are ganged for operation by passage of the ejector seat, 200 milliseconds after initiation of the sequence.

The canopy separation sub-circuit comprises normally open switches 24, 25 in parallel leading to an element 14. The switches 24 are ganged and arranged for manual operation by aircrew and the switches 25 are ganged and arranged for manual operation external to the aircraft.

In operation o the canopy shattering sub-system, when the switches 22 are closed at initiation of an ejection sequence the surge of current from the batteries 20 through the inductances 21 generates a self-excited current pulse which peaks at about instant of opening of the switches 23 and blows the elements 13. These, partly by fusion, partly by the exothermic alloying of the aliuminium and the palladium, and party by the direction of plasma energy along the median lines of the V's in the elements, shatter the canopy in the path of the ejection seat.

In operation of the canopy separation sub-system, closure of either switches 24 or 25 allows the inductances 21 to self excite in response to the surge of current from the batteries. The lack of local regions of increased resistivity in the elements 14 obviates the use of a delay system, and when the self-excited pulse is adequate it detonates the elements 14 which break the canopy, including the leads to the elements 13, away from the frame 12. The small extensions of the elements 14 beyond connecting leads therefore will fuse, non-explosively, due to the exothermic combination of the metals alone.

The above description is by way of example only, and it will be appreciated that the invention may be realized in a variety of embodiments without departing from the scope thereof. For example a canopy shattering system may suffice for non ejection emergency egress, in which case the circuit may have switches in parallel with switches 22 and a delay system, mechanical electrical or chemical, initiated thereby to open the switches 23. For such an embodiment the switches 23 would probably note be arranged for operation by the ejector seat. Alternatively the canopy separation sub-system may comprise means in accordance with the present invention while the shattering sub-system is that described in U.S. Pat. No. 4,275,858. The source of power may be any of those described in U.S. Pat. No. 4,275,858.

I claim:

1. In an aircraft, a cockpit canopy made of electrically insulative plastics, and means for fracturing said canopy, said fracturing means being in the form of an electrical circuit associated with a DC power source in said aircarft, said circuit consisting essentially of:

at least one fusible electrical conductor in tape form and consisting of 25%–66% aluminium by weight sheathed in 75%–33% palladium by weight and embedded in and in intimate contact with said canopy with the plane of said at least one conductor substantially normal to the local surface of said canopy;

a power booster consisting essentially of an inductance electrically connected to said at least one conductor and operative to provide power both to explode said at least one conductor and to initiate a violent exothermic alloying between said palladium and said aluminium and thus to fracture said canopy by generating a crack therein along said conductor; and switch means electrically connected to said at least one conductor and operative to permit a surge of electrical energy from said DC power source to said inductance.

2. Panel breaking apparatus as claimed in claim 1 and wherein the palladium contains up to 6% ruthenium by weight.

3. Panel breaking apparatus as claimed in claim 1 and wherein the aluminium contains a small amount of at least one of chromium, copper, iron magnesium, manganese, silicon and zinc.

4. Panel breaking means as claimed in claim 4 wherein said switch means comprises an initialling switch in series with said power source and said conductor and a by-pass switch normally closed and in parallel with said conductor, and arranged to open when full power is available from said inductance.

5. Panel breaking means as claimed in claim 4 and wherein said by-pass switch is operable by passage of an ejector seat.

6. In an aircraft, a cockpit canopy made of electrically insulative plastics and means for fracturing said canopy, said fracturing means being in the form of an electrical circuit associated with a DC power source in said aircraft, said circuit consisting essentially of:

at least one fusible electrical conductor consisting of 25%–66% by weight aluminium sheathed in 75%–33% by weight palladium, the aluminium containing a small amount of at least one of chromium, copper, iron, magnesium, manganese, silicon and zinc and the palladium containing up to 6% by weight ruthenium, and said at least one conductor being in the form of a flat wire conductor and embedded in and in intimate contact with said canopy with the plane of the wire substantially normal to the surface of said canopy for generating a crack therein along said conductor, at least one inductance electrically connected to said at least one conductor and operative to provide power both to explode said at least one conductor and to initiate a violent exothermic alloying between said palladium and said aluminium and thus to fracture said canopy, initiating switch means electrically connected in series with said at least one conductor and said at least one inductance and operative to permit a surge of electrical energy from said DC power source to said at least one inductance, and by-pass switch means electrically connected in said circuit in parallel with said at least one conductor and normally closed and operable to open when full power is available from said at least one inductance.

* * * * *